United States Patent [19]

Nishioka

[11] Patent Number: 4,602,435
[45] Date of Patent: Jul. 29, 1986

[54] ALIGNING MECHANISM FOR POWER HAND SAWS

[76] Inventor: Jim Z. Nishioka, 1268 Hemlock N.W., Salem, Oreg. 97304

[21] Appl. No.: 740,032

[22] Filed: Jun. 20, 1985

Related U.S. Application Data

[63] Continuation of Ser. No. 589,312, Mar. 14, 1984, abandoned.

[51] Int. Cl.[4] .............................................. B27B 9/04
[52] U.S. Cl. ........................................ 30/372; 83/745
[58] Field of Search ......................... 30/372, 376, 371; 83/745, 743, 574

[56] References Cited

U.S. PATENT DOCUMENTS

| | | | |
|---|---|---|---|
| 3,045,724 | 7/1962 | Mitchell | 83/574 |
| 3,757,628 | 9/1973 | Camacho | 83/745 |
| 4,202,233 | 5/1980 | Larson | 30/376 X |
| 4,335,512 | 6/1982 | Sheps | 30/376 |
| 4,453,312 | 6/1984 | Nishioka | 30/372 |

Primary Examiner—Jimmy C. Peters

[57] ABSTRACT

An aligning mechanism for power hand saws in the preferred structure of this disclosure is connected to a saw. The saw comprises a motor, a handle, and a blade. The mechanism comprises a guide member extending substantially in same direction as a cutting motion of the saw blade and an aligning device extending substantially transversely from the guide member. The aligning device is engaged to the guide member so that at least a portion of the guide member slides forwardly with a saw blade during guiding movements of the mechanism. The guide member comprises an elongated outer portion and an elongated inner portion. The elongated outer portion is hollow and the elongated inner portion is slidably engaged to such elongated outer portion. A resilient element is positioned on the guide member to urge the aligning device in a forwardly direction. The aligning device has an operable position and a non-operable position. In the operable position the aligning device is positioned to engage a work piece and in the non-operable position is positioned away from the work piece to allow non-guided use of the saw.

12 Claims, 4 Drawing Figures

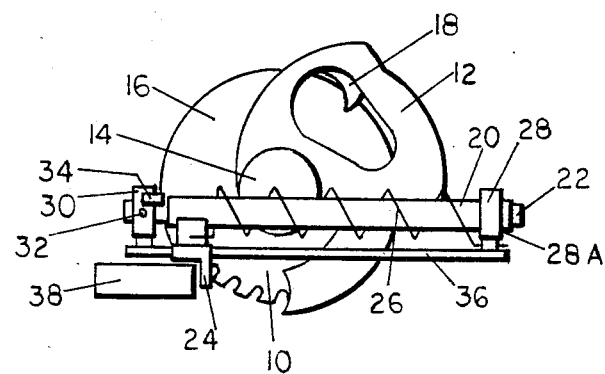
FIG. 1
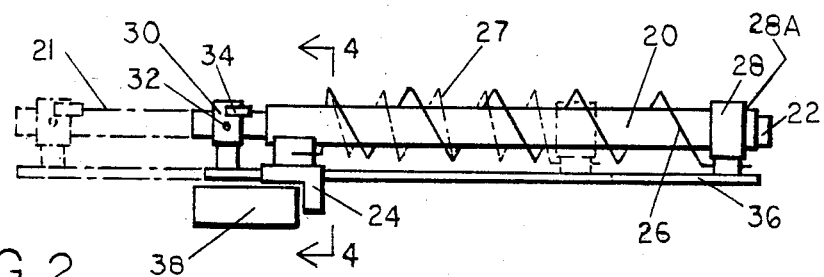
FIG. 2
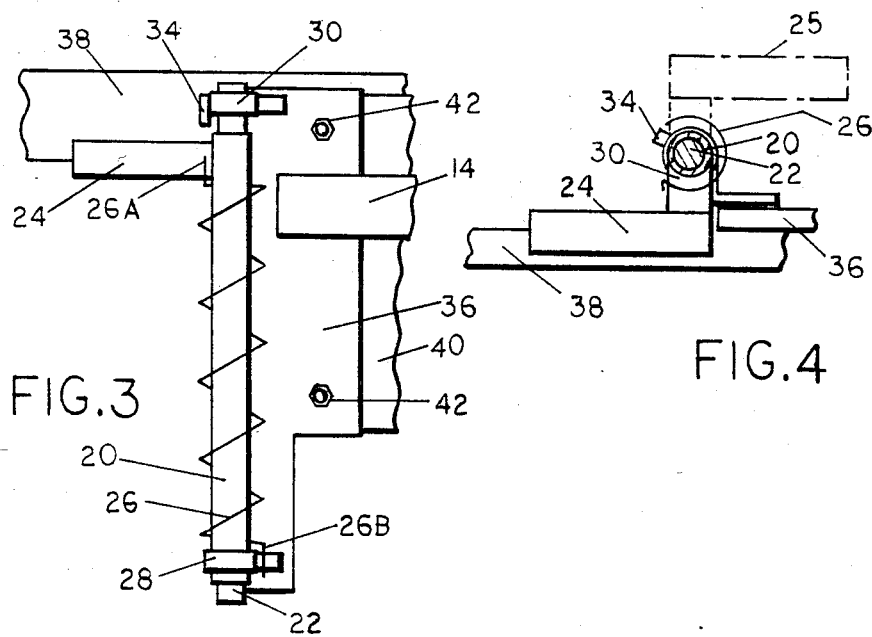
FIG. 3
FIG. 4

ALIGNING MECHANISM FOR POWER HAND SAWS

BACKGROUND OF THE INVENTION

This application is a continuation of Ser. No. 06/589,312 filed Mar. 14, 1984, now abandoned.

This invention relates to new and useful improvements in aligning mechanisms for power hand saws.

Mechanisms for guiding cutting movements of power hand saws are useful in providing accuracy, efficiency and convenience. Devices have been employed for such guiding but have been complex and bulky.

SUMMARY OF THE INVENTION

According to the present invention and forming primary objectives thereof, an aligning mechanism for power hand saws is provided having a novel structural arrangement of a guide member, an aligning device, and a resilient device.

An important feature of the present invention is that the aligning device can be positioned in an operable position to engage a work piece for guiding a saw blade and also can be positioned in a non-operable position for non-guided use of the saw. The aligning device in such non-operable position allows conventional use of the saw without dismantling or removing any portion of the mechanism. This saves the operator time when switching from guided use to non-guided use of the saw. This feature is believed to be an improvement over prior structures.

A further advantage is that the sliding of the elongated inner portion of the guide member in the hollow elongated outer portion of the guide member provides a smooth, bind-resistant sliding link between the aligning device and the saw blade. This also is believed to be an improvement over prior structures.

A still further feature of the present invention is the resilient element which is wrapped around the guide member to urge the aligning device in a forwardly direction. The use of such resilient element simplifies manufacturing and reduces parts required and also is believed to be an improvement over prior structures.

Another advantage is that the saw blade will cut to its normal depth since the mechanism is not attached to the bottom of a saw's base plate.

A still further advantage is that the mechanism provides a compact profile for easy handling and use in close quarters.

In carrying out the invention a mechanism is connected to a power hand saw. The mechanism includes a guide member extending longitudinally in substantially the same direction as a cutting motion of the saw blade. The mechanism also includes an aligning device for butting against a work piece to align a saw blade, such device extending substantially transversely from the guide member. The mechanism also includes a resilient element for urging the aligning device forwardly.

The invention will be better understood and additional objects and advantages thereof will become apparent from the following description taken in connection with the accompanying drawings of the preferred structure of the invention.

BRIEF DESCRIPTION OF THE DRAWINGS

FIG. 1 is an elevational view of the aligning mechanism for guiding power hand saws;

FIG. 2 is an enlarged fragmentary elevational view of the invention;

FIG. 3 is a fragmentary top plan view of the invention; and

FIG. 4 is a sectional view taken on lines 4—4 of FIG. 2.

DETAILED DESCRIPTION OF PREFERRED EMBODIMENTS

With particular reference to the drawings the present disclosure includes a saw blade 10, a handle 12, a motor 14, a blade guard 16, a trigger switch 18, a guide member comprising an elongated outer portion 20 and an elongated inner portion 22, an aligning device 24, a resilient element 26, resilient element extensions 26A and 26B, connecting supports 28 and 30, a bore 28A in support 28, a pin 32, a holding lug 34, a guide base plate 36, a work piece 38, a saw base plate 40, and studs 42.

The guide member comprises the elongated outer portion 20 and the elongated inner portion 22, both such portions extending longitudinally in substantially the same direction as the cutting motion of the saw blade 10. The aligning device 24 is for butting against the work piece 38 and extends substantially transversely from such inner and outer portions to align a saw blade relative to the work piece.

The elongated outer portion 20 is hollow and slidably receives the elongated inner portion 22. The elongated inner portion is connected to the guide base plate 36 by support 30 and is rigidly secured to the support by pin 32. The support 30 is positioned on the forwardly portion of the elongated inner portion 22. The elongated outer portion 20 is slidably connected to the guide base plate 36 by support 28. The aligning device 24 remains substantially stationary with the work piece 38 during operation of the mechanism.

Friction reducing means such as a plastic sleeve or a linear ball bearing may be employed in the bore 28A of the support 28 to reduce friction.

The sliding movement of the elongated inner portion 22 in the elongated outer portion 20 provides a smooth and accurate sliding link between the aligning device 24 and the saw blade 10. This is an important feature of the present invention. This sliding action is shown in FIG. 2 with a forwardly position of the elongated inner portion 22, support 30 and the guide base plate 36 shown by broken lines 21. The elongated inner portion 22 of the guide member moves forwardly with the support 30 during forwardly movements of the saw blade 10.

The elongated outer portion 20 of the guide member and the aligning device 24 are pivotable since the elongated outer portion is slidably and pivotably engaged to the elongated inner portion 22 and the bore 28A of the support 28. This allows the aligning device to be pivoted from its operable position for engaging a work piece 38, best seen in FIG. 4, to its pivoted non-operable position away from the work piece. The non-operable position is indicated by broken lines 25. This is an important feature of the invention since it permits the operator to quickly and easily convert the saw from an operable guided mode for guiding the forward cutting movement of the saw blade 10 to a non-operable mode for conventional non-guided use of the saw.

A holding lug 34 on the support 30 is provided to hold the aligning device 24 in the non-operable position shown by the broken lines 25. When the holding lug 34 is engaged to the aligning device 24, the resilient element 26 will urge the aligning device forwardly to maintain such engagement. It can be seen that such engagement can be broken by moving the aligning device 24 rearwardly against the resistive tension of the resilient element 26 so that the aligning device can be pivoted downwardly to engage the work piece.

The downward or counter-clockwise pivoting movement of the aligning device 24 is restricted by the guide base plate 36 and positions the aligning device 24 to engage the work piece 38, best seen in FIG. 4.

The resilient element 26 comprising an elongated spring extends longitudinally along and is supported by the elongated outer portion 20 of the guide member. The resilient element urges the aligning device 24 forwardly to its normal position to engage a work piece 38. The resilient element 26 is believed to be an important feature due to its simplicity and low cost. The resilient element also transfers torque to the aligning device and urges it to pivot in a counter-clockwise direction due to the engagement of resilient element extension 26A to the aligning device 24 and the engagement of resilient element extension 26B to the connecting support 28, best seen in FIG. 3. This transfer of torque also urges the aligning device to engage the guide base plate 36 to position the aligning device for engaging the work piece 38. Broken lines 27 of FIG. 2 indicate the partial compressed position of the resilient element 26 during forwardly guiding movements of the mechanism.

Furthermore, the resilient element 26 is wrapped around the smooth surface of the elongated outer portion 20 which provides an even resistive tension on the aligning device 24 during operation of the mechanism. Also, such wrapping of the resilient element over the elongated outer portion maintains such element in correct alignment. Although a compression type coil spring is shown in this preferred structure, other resilient elements may be employed.

The mechanism is suitable for manufacturing as an after-market attachment or can be manufactured as a part of the saw. The guide base plate 36 and the saw base plate 40, best seen in FIG. 3, are shown as two pieces, however, they may be manufactured as a single integral unit. The two-piece construction shown is suitable when the mechanism is manufactured as an after-market attachment and a single piece base would be suitable when the mechanism is manufactured as a part of a saw.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A mechanism for guiding cutting movements of a portable power saw having a saw blade, said mechanism comprising guide means extending longitudinally in substantially same direction as a cutting motion of a saw blade,
connecting means for connecting said guide means to a saw,
aligning means for butting against a work piece to align a saw blade, said aligning means extending substantially transversely from said guide means, and
resilient means for urging said aligning means in a forwardly direction,
said aligning means being slidably and pivotably engaged to said guide means so that at least a portion of said guide means will slide forwardly with a saw blade during a guiding movement of said mechanism,
said resilient means including torque transferring means, said torque transferring means engaging said aligning means for urging a pivoting movement of said aligning means.

2. The mechanism of claim 1 wherein said torque transferring means engages said resilient means to both said aligning means and said connecting means so that said resilient means will urge said aligning means to pivot in a counter-clockwise direction.

3. The mechanism of claim 1 wherein said mechanism includes means for stopping a downward counter-clockwise pivoting movement of said aligning means and positioning it for engagement with a work piece.

4. A mechanism for guiding cutting movements of a portable power saw having a saw blade, said mechanism comprising guide means extending longitudinally in substantially same direction as a cutting motion of a saw blade,
connecting means for connecting said guide means to a saw, and
aligning means for butting against a work piece to align a saw blade, said aligning means extending substantially transversely from said guide means,
resilient means for urging said aligning means in a forwardly direction,
said aligning means being slidably engaged to said guide means so that at least a portion of said guide means will slide forwardly with a saw blade during a guiding movement of said mechanism,
said resilient means extending longitudinally along and wrapping around at least a portion of said guide means.

5. The mechanism of claim 4 wherein said connecting means includes a forwardly positioned support and a rearwardly positioned support for connecting said guide means to a saw, said resilient means being positioned on said guide means between said aligning means and said rearwardly positioned support.

6. The mechanism of claim 5 wherein said resilient means is wrapped around said guide means between said rearwardly positioned support and said aligning means so that during a forwardly cutting movement of the saw said rearwardly positioned support will move forwardly and compress said resilient means against said aligning means.

7. The mechanism of claim 4 wherein said guide means comprises an elongated inner portion and an elongated outer portion, said elongated inner portion being slidably engaged to said elongated outer portion, said resilient means extending longitudinally along and wrapped around said elongated outer portion.

8. The mechanism of claim 4 wherein said connecting means comprises a forwardly positioned support and a rearwardly positioned support for supporting said guide means on a saw, said guide means including an elongated inner portion and an elongated outer portion, said elongated inner portion being slidably engaged to said elongated outer portion, said elongated inner portion being rigidly connected to said forwardly positioned support and said elongated outer portion being slidably supported by and extending through said rearwardly positioned support.

9. The mechanism of claim 8 wherein said aligning means is connected to said elongated outer portion so that during a forwardly cutting motion of a saw, said elongated outer portion will slide rearwardly through said rearwardly positioned support.

10. A mechanism for guiding cutting movements of a portable power saw having a saw blade, said mechanism comprising guide means extending longitudinally in substantially same directiion as a cutting motion of a saw blade, connecting means for connecting said guide means to a saw, and aligning means for butting against a work piece to align a saw blade, said aligning means extending substantially transversely from said guide means, said aligning means being slidably and pivotably engaged to said guide means so that at least a portion of said guide means will slide forwardly with a saw blade during a guiding movement of said mechanism, said aligning means having an operable or downwardly pivoted position and a non-operable or upwardly pivoted position, said operable or downwardly pivoted positon of said aligning means being for engaging a work piece and said non-operable or upwardly pivoted position of said aligning means being for positioning said aligning means up and away from a work piece to provide a non-guided use of a saw, means on said mechanism for engaging said aligning means so that when said aligning means is pivoted to the raised non-operable position said resilient means will urge said aligning means forwardly and hold said aligning means in the raised non-operable position.

11. The mechanism of claim 10 wherein said aligning means is releasable from the raised non-operable position to the operable position by a rearwardly movement of said aligning means.

12. The mechanism of claim 10 wherein said means for engaging said aligning means comprises a rearwardly extending lug.

* * * * *